Figure 2:
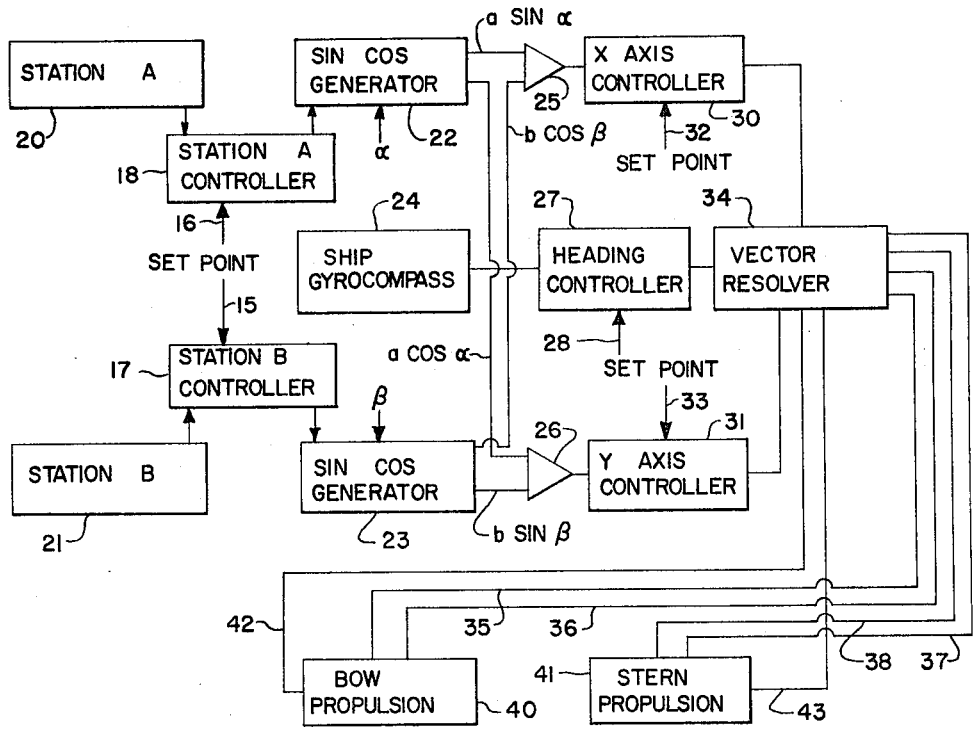

Oct. 18, 1966  H. L. SHATTO, JR., ET AL  3,280,311

SHIP POSITIONING

Filed July 27, 1962

INVENTORS:
H. L. SHATTO JR.
J. R. DOZIER

BY: Theodore E. Bieber

THEIR ATTORNEY

United States Patent Office 3,280,311
Patented Oct. 18, 1966

3,280,311
SHIP POSITIONING
Howard L. Shatto, Jr., Palos Verdes, and James Ronald Dozier, Whittier, Calif., assignors to Shell Oil Company, New York, N.Y., a corporation of Delaware
Filed July 27, 1962, Ser. No. 212,872
3 Claims. (Cl. 235—150.27)

This invention pertains to a ship positioning system and more particularly to a system utilizing an input signal in the form of a measured distance from two known locations. The positioning system then maintains the ship a fixed distance from the two known locations.

In the drilling of offshore oil wells in deep water it is necessary to drill from a floating vessel that is positioned over a wellhead located on the ocean floor. The vessel is normally anchored over the wellhead to maintain it in position but the use of anchors is limited to rather shallow depths. As the depth of the water increases it is necessary to maintain the vessel dynamically anchored over the wellhead. In the copending application of H. L. Shatto, Jr. and J. R. Dozier, Serial No. 95,601, filed March 14, 1961, now Patent No. 3,187,704, entitled "Ship Positioning," there is described a system for dynamically anchoring the vessel over the wellhead. The system described in this copending application utilizes a plurality of propulsion means similar to outboard motors. These individual propulsion means are then directed and their speed controlled to maintain the vessel over the wellhead. A taut line extends from the vessel to a position on the ocean floor bearing a fixed relationship to the wellhead with the angular deflection of the taut line being used to detect any drift of the vessel from the desired location.

The system of the above copending application provides a satisfactory method for dynamically positioning a floating drilling vessel over a wellhead when it is possible to lower an anchor to the ocean floor. In many cases though it is desired to position the floating drilling vessel using other means of detecting vessel position. Such other means may be devices which provide information in the form of measured distances between the vessel and known locations. Thus, by measuring the distances between the vessel and at least two known locations one can accurately position the drilling vessel. This provides two measured distances in place of the angular deflections utilized in the copending application as a means of determining the location of the floating vessel with respect to its desired location. In order for the prior ship positioning system to utilize the inputs in the form of measured distances it is necessary to convert the measured distances into error signals which are aligned with the control axes of the floating vessel.

Accordingly, it is the principal object of this invention to provide a control system for dynamically anchoring a floating vessel over a desired position utilizing distances measured between the vessel and fixed locations having a known geographical position as the inputs to the control system.

A further object of this invention is to provide a control system for dynamically anchoring a floating vessel in which measured distances are used as the control inputs. The measured distances in turn are compared to the desired distances to generate error signals which are then used to position the vessel.

A still further object of this invention is to provide a control system for dynamically anchoring floating vessels in which the measured distances are converted to error signals along the control axes of the vessel and these error signals are then used as the inputs to the ship positioning system.

The above objects and advantages of this invention are achieved by utilizing a vessel positioning system of the above referenced copending application to position the vessel over the desired location. To obtain suitable inputs for the control system of the copending application the distances between the vessel and fixed locations having a known geographical postion are measured. These distances are then compared with the desired distances to obtain distance error signals. The distance error signals are then supplied to sine and cosine generators that multiply the distance error signals by the sine and cosine of suitable angles. These angles are related to the angle between the control axis of the vessel and a line joining the vessel to the fixed position. By multiplying the measured distances by the sine and the cosine of the aforementioned angles one obtains signals that are related to the control axes of the vessel. In addition, these signals indicate the displacement of the floating vessel from its desired position along the control axes of the vessel. Thus it is possible to add the signals to obtain two signals indicating the displacement along the control axes of the floating vessel that may be used as the input signals to the ship positioning system described in the aforementioned copending application.

Figure 1:
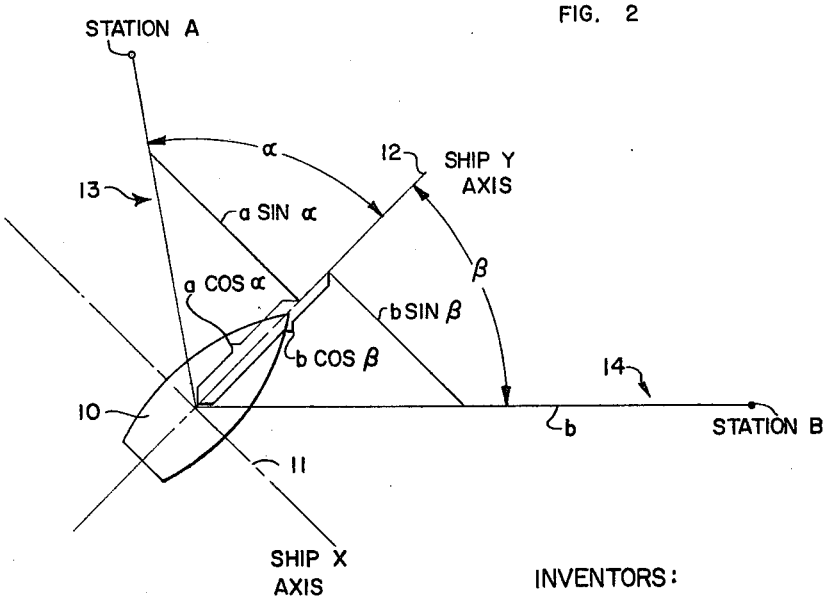

The above objects and advantages of this invention will be more easily understood from the following detailed description of a preferred embodiment when taken in conjunction with the attached drawing in which:

FIGURE 1 is a diagrammatic sketch showing the positioning of a floating vessel by measuring distances from two fixed positions that have a known geographical location; and, FIGURE 2 is a block diagram showing one embodiment of this invention.

Referring now to FIGURE 1, there is shown a diagram in which a vessel 10 is positioned a fixed distance from two locations indicated as station A and station B. Station A and station B have a known geographical location. For example, they may be of the type of electronic navigation aids in which a signal is transmitted when an appropriate trigger signal is received by the station wherein the transmitted signal indicates the distance between the station and the vessel transmitting the original trigger signal. One particular type of electronic navigation system is known as a Shoran system and is in fairly wide use along the coast line of the United States, particularly in the Gulf of Mexico area where offshore oil wells are drilled.

The longitudinal axis 12 of the ship is denoted as the Y axis while the athwartships axis 11 is denoted as the X axis. In addition to the above measurements the angle $\alpha$ between the Y axis and a line 13 joining the station A to the vessel is measured and that angle $\beta$ between the Y axis and a line 14 joining the vessel 10 to the station B is measured. The angles $\alpha$ and $\beta$ may be measured by various electronic means or may be obtained manually from a chart showing the location of the stations A and B and the vessel 10.

Normally it will be required to maintain the vessel 10 a fixed distance from the station A and station B. If the vessel is not located in the proper position one or both of the distances will be in error. The error signal related to each station can be converted into distances along the X and Y axis of the vessel by well known trigonometry functions. For example, if the distance from the station A were multiplied by the sine and the cosine of the angle $\alpha$ this would convert the error to appropriate distances along the X and the Y axis of the vessel 10. Similarly, the error in the distance from the station B could be converted into distances along the X and the Y axis of the vessel 10. The distances along the X and the Y axis of the vessel could then be added algebraically to obtain two error signals which indicate the displacement error of the vessel from its desired position along the X and the Y axis of the vessel. These two displacement signals could then be supplied to the ship control system of the above-referenced copending application.

As explained in the above copending application, the vessel 10 is normally provided with a plurality of propulsion units that have a means for varying both the magnitude of the thrust of the propulsion units as well as the direction of the thrust. These propulsion units are located at positions on the vessel spaced from the turning center of the vessel 10. Thus, by proper maneuvering of the propulsion units one can move the vessel along any desired course or turn it about its turning center without lateral displacement. The propulsion units can be normal outboard motor type devices which have 360° of rotation and a means for varying the speed of rotation of the propellers. The control system of the copending application accepts two signals which indicate displacement of the vessel from its desired location along the X and the Y axis of the vessel. In addition, the control system receives a signal indicating the displacement of the vessel from its desired heading. The control system then vectorially resolves these input signals to provide suitable signals for controlling both the thrust supplied by the propulsion units as well as the direction of the thrust to move the vessel back to its desired location.

Referring now to FIGURE 2, there is shown a block diagram by which the measured distances may be converted into appropriate input signals from the vessel positioning system described in copending application. Blocks 20 and 21 represent the stations A and B of FIGURE 1, respectively. As explained, these stations may be various electronic navigation aids that transmit a signal indicating the distance between the vessel and the station when the station is triggered by an appropriate signal sent by the vessel. The signal from station A is supplied to a controller 18 where it is compared with a set point 16 that represents the desired distance from station A. The controller 18 preferably is provided with the normal control actions such as proportional, rate and reset actions. The output signal from the controller 18 is supplied to a sine-cosine generator 22. In a similar manner, the signal from station B is supplied to a controller 17 having a set point 15. The output signal of controller 17 is supplied to a sine-cosine generator 23. In addition, the sine and cosine generator 22 receives an input signal related to the angle $\alpha$ while the sine-cosine generator 23 receives an input signal related to the angle $\beta$. The sine-cosine generators 22 and 23 are designed to generate the sine and the cosine of the angles $\alpha$ and $\beta$, respectively, and then multiply the signal received from the controllers 17 and 18 to supply two outputs that are related to the error signal multiplied by the sine and the cosine of the angles $\alpha$ and $\beta$.

The signals from the sine-cosine generator 22 are indicated as a sine $\alpha$ and a cosine $\alpha$ while the signals from the sine-cosine generator 23 are indicated as b sine $\beta$ and b cosine $\beta$. The signal a sine $\alpha$ and signal b cosine $\beta$ are supplied to an adding amplifier 25 that supplies an output signal related to the algebraic sum of the two input signals. Similarly, the signal b sine $\beta$ and a cosine $\alpha$ are supplied to an adding amplifier 26 that supplies an output signal related to the algebraic sum of the two input signals. The signal from the adding amplifier 25 is supplied to a controller 30 that corresponds to the X axis controller shown and described in the aforementioned copending application. Similarly, the signal from the amplifier 26 is supplied to a controller 31 corresponding to the Y axis controller in the copending application. The controller 30 has a set point 32 while the controller 31 has a set point 33. In addition, the two controllers are provided with both rate, proportional and reset control actions as set forth in the copending application. The two controllers 30 and 31 are connected to a vector resolving unit 34 that in addition receives a signal related to the ship's heading from a gyrocompass 24. The signal from the gyrocompass 24 is supplied by a controller 27 having a set point 28. The controller 27 is similar to controllers 30 and 31 and receives the ship's heading from gyrocompass 24 and compares it with the desired heading to supply a correction signal to the vector resolver 34. The vector resolver supplies two control signals for each propulsion unit 40 and 41. The propulsion unit 40 is denoted as the bow propulsion unit while the propulsion unit 41 is denoted as the stern propulsion unit. The vector resolver is coupled to the bow propulsion unit 40 by means of leads 35 and 36 and to the stern propulsion unit 41 by means of leads 37 and 38. In addition the two propulsion units are coupled to the vector resolver by means of leads 42 and 43 to provide feedback signals to the vector resolver 34. The construction and operation of the controllers 27, 30 and 31, the vector resolver 34 and the propulsion units are more particularly described and claimed in the aforementioned copending application. It is sufficient for the purpose of this invention to note that the vector resolver receives the signals from the three controllers and then vectorially adds the signals to obtain two resulting signals for each propulsion means. One signal indicates the thrust which must be supplied by each of the propulsion units while the other indicates the angle in which the thrust from each of the propulsion units must be directed to move the vessel to its desired position. The vector resolving unit thus combines the input information to efficiently move the vessel back to its desired position.

The operation of this invention can be best understood by referring again to FIGURE 1. In FIGURE 1 the distances from the two stations A and B are denoted as a and b, respectively. In addition, it is shown how an error signal from the station A is converted into distances along the X and Y axis of the ship by multiplying the error signal a by the sine and the cosine of the angle $\alpha$. Similarly, an error signal b from the station B is converted into signals along the X and Y axis of the vessel 10 and multiplied by the sine and cosine of the angle $\beta$. It is understood, of course, that the error signals a and b are supplied by the controllers 17 and 18 shown in FIGURE 2. As explained above, the controllers compare the measured distances from the stations A and B with the desired distances from the two stations and supply an output signal related to the difference. The sine and cosine generators 22 and 23 then convert the error signals a and b into signals along the X and Y axis of the vessel 10. The signals along the X and Y axis may then be algebraically added by adding amplifiers 25 and 26 to supply two signals indicating the error in the displacement of the vessel 10 from its desired position. These two signals will be along the X and Y axis of the vessel 10. The two signals are then supplied to the two controllers shown and described in the copending application. The ship control unit will then control the propulsion units 40 and 41 to move the vessel back to its desired location. When the vessel arrives at its desired location the error signals a and b will be reduced to zero and no further input signals will be received by the controllers 30 and 31.

We claim as our invention:

1. A system for positioning a vessel having a plurality of variable thrust means located at positions spaced from the turning center of the vessel, said thrust means in addition having means for varying the direction of thrust, said system comprising:

means for measuring the distance of the vessel from at least two positions having fixed geographical locations;

comparing means coupled to the measuring means for determining the difference between the measured distance and preset distances, said comparing means supplying distance error signals related to said differences for each of said positions;

a sine cosine generating means for generating signals related to the sine and cosine of the angles α and β wherein α and β are the two angles between a reference axis on the vessel and a line joining the vessel and each of the positions;

said comparing means being coupled to said sine cosine generating means to supply said distance error signals to said sine cosine generating means, said sine cosine generating means multiplying one of said distance error signals by the sine and cosine of one of said angles α and β and the other of said distance error signals by the sine and cosine of the other of said angles α and β, said sine cosine generating means supplying output signals related to the products of said multiplication;

an adding device coupled to said sine cosine generating means to add the product signal of sine of one of the angles multiplied by the distance error signal for one position to the product signal of the cosine of the other of the angles multiplied by the distance error signal for the other position to provide a first control signal;

a second adding device coupled to said sine cosine generating means to add the product signal of the sine of one of the angles multiplied by the distance error signal of said other position to the product signal of the cosine of the other of the angles multiplied by distance error signal of said one position to provide a second control signal;

a control means, said control means being coupled to said first and second adding devices, said control means in addition being coupled to said thrust means to control the operation thereof, said control means being adjusted to control said thrust means to maintain said distance error signals at zero value.

2. A system for positioning a vessel having a plurality of variable thrust means located at positions spaced from the turning center of the vessel, said thrust means in addition having means for varying the direction of thrust, said system comprising:

distance measuring means positioned on said vessel to measure the distance from the vessel to two locations having a fixed geographical location, said measuring means supplying first and second distance signals related to the measured distances;

a comparing circuit, said distance measuring means being coupled to said comparing circuit to compare said first and second distance signals with preset values to obtain first and second distance error signals;

a first sine-cosine generating means, said comparing means being coupled to said first sine-cosine generating means to supply said first distance error signal to said sine cosine generating means, said first sine-cosine generating means in addition being supplied with a signal related to a first angle between a major axis of the vessel and a line joining one of said locations and said vessel, said sine-cosine generating means supplying a first error signal related to the first distance error signal multiplied by the sine of said first angle and a second error signal related to the first distance error signal multiplied by the cosine of said first angle;

a second sine-cosine generating means, said comparing means being coupled to said second sine-cosine generating means to supply said second distance error signal to said second sine-cosine generating means, said second sine-cosine generating means in addition being supplied with a signal related to a second angle between said major axis and a line joining the other of said locations and said vessel, said sine-cosine generating means supplying a third error signal related to the second distance error signal multiplied by the sine of said second angle and a fourth error signal related to the second distance error signal multiplied by the cosine of said second angle;

a first adding means coupled to said first and second sine-cosine generating means to add said first and fourth error signal and supply a first control signal;

a second adding means coupled to said first and second sine-cosine generating means to add said second and third error signals to supply a second control signal;

a first controller, said first adding means being coupled to said first controller having a set point, said set point being adjusted to the desired value of said first control signal;

a second controller, said second adding means being coupled to said second controller having a set point, said set point being adjusted to the desired value of said second control signal;

a vector resolving unit, said first and second controllers being coupled to said vector resolving unit;

a compass means;

a heading controller, said compass means being coupled to said heading controller to compare the actual heading of the vessel with the desired heading and supply a heading error signal;

said heading controller being coupled to said vector resolving unit, said vector resolving unit resolving said first and second control signals and said heading error signal to provide separate control signals for each of said thrust means.

3. A system for positioning a vessel having a plurality of variable thrust means located at positions spaced from the turning center of the vessel, said thrust means in addition having means for varying the direction of thrust, said system comprising:

distance measuring means for determining the distance from the vessel to a first fixed location and the distance from the vessel to a second fixed location;

a comparing circuit coupled to said distance measuring means for comparing the measured distances with preset values of the measured distances to obtain distance error signals $a$ and $b$;

a first sine-cosine generating means coupled to said comparing means to multiply $a$ by the sine and cosine of the angle α wherein α is the angle between the longitudinal axis of the vessel and a line joining the vessel and said first location;

a second sine-cosine generating means coupled to said comparing means to multiply $b$ by the sine and cosine of the angle β wherein β is the angle between the longitudinal axis of the vessel and a line joining the vessel and said second location;

a first adding circuit coupled to said first and second sine-cosine generating means to add $a$ sine α and $b$ cosine β to obtain a first control signal;

a second adding circuit coupled to said first and second sine-cosine generating means to add $a$ cosine α and $b$ sine β to obtain a second control signal;

a control system coupled to said first and second adding means to control said thrust means to position the vessel to maintain said first and second control signals at predetermined levels.

References Cited by the Examiner
UNITED STATES PATENTS

| | | | |
|---|---|---|---|
| 3,002,691 | 11/1961 | Newell | 235—187 |
| 3,145,683 | 8/1964 | Kolb et al. | 114—144 |

MALCOLM A. MORRISON, *Primary Examiner.*

K. W. DOBYNS, *Assistant Examiner.*